(12) United States Patent
Sirpal et al.

(10) Patent No.: US 10,310,706 B2
(45) Date of Patent: Jun. 4, 2019

(54) SYSTEM AND METHODS FOR TOUCH TARGET PRESENTATION

(71) Applicants: Jamdeo Canada Ltd., Oakville (CA); Qingdao Hisense Electronics Co., Ltd., Qingdao, Shandong (CN); Hisense USA CORP., Suwanee, GA (US); Hisense International Co., Ltd., Qingdao (CN)

(72) Inventors: Sanjiv Sirpal, Oakville (CA); Mohammed Selim, Oakville (CA)

(73) Assignee: Qingdao Hisense Electronics Co., Ltd., Qingdao (CN)

(*) Notice: Subject to any disclaimer, the term of this patent is extended or adjusted under 35 U.S.C. 154(b) by 254 days.

(21) Appl. No.: 15/133,859

(22) Filed: Apr. 20, 2016

(65) Prior Publication Data

US 2016/0378293 A1 Dec. 29, 2016

Related U.S. Application Data (60) Provisional application No. 62/183,613, filed on Jun. 23, 2015, provisional application No. 62/184,476, filed on Jun. 25, 2015.

(51) Int. Cl.
*G06F 3/0484* (2013.01)
*H04M 1/725* (2006.01)
(Continued)

(52) U.S. Cl.
CPC ............ *G06F 3/0482* (2013.01); *G06F 3/017* (2013.01); *G06F 3/0481* (2013.01); *G06F 3/0484* (2013.01); *G06F 3/0485* (2013.01); *G06F 3/0488* (2013.01); *G06F 3/04817* (2013.01); *G06F 3/04842* (2013.01); *G06F 3/04845* (2013.01); *G06F 3/04847* (2013.01);
(Continued)

(58) Field of Classification Search
CPC .. G06F 3/0482; G06F 3/0481; G06F 3/04842; G06F 3/04883; G06F 3/0485; G06F 3/017; G06F 3/04847; G06F 3/04817; G06F 3/0484; G06F 3/04845; G06F 3/0488
See application file for complete search history.

(56) References Cited

U.S. PATENT DOCUMENTS

| | | | |
|---|---|---|---|
| 7,268,772 B2 * | 9/2007 | Kawai | G06F 3/04842 178/18.01 |
| 8,786,569 B1 * | 7/2014 | Silverberg | G06F 3/0481 345/173 |

(Continued)

*Primary Examiner* — Amy M Levy
(74) *Attorney, Agent, or Firm* — Gordon & Rees LLP (57) ABSTRACT

The present disclosure relates to user interfaces and in particular to providing a touch target for device interaction. In one embodiment, a process for providing a touch target includes displaying, by a device, a touch target on a display of the device, wherein the touch target is displayed in a first position, and detecting an input touch command to the display of the device. The process can also include positioning the touch target based on the input touch command, wherein the touch target is moved to a second position and controlling device operation based on position of the touch target. The processes and devices described herein may be configured to project contact position of a contact to portions of the display.

20 Claims, 6 Drawing Sheets

(51) Int. Cl.

| | | |
|---|---|---|
| *G06F 3/0482* | (2013.01) | |
| *G06F 3/0488* | (2013.01) | |
| *G06F 3/0485* | (2013.01) | |
| *H04B 1/3827* | (2015.01) | |
| *G06F 3/16* | (2006.01) | |
| *G06F 3/01* | (2006.01) | |
| *H04N 5/77* | (2006.01) | |
| *G06F 16/31* | (2019.01) | |
| *G06F 16/35* | (2019.01) | |
| *G06T 11/60* | (2006.01) | |
| *H04L 12/58* | (2006.01) | |
| *H04L 29/08* | (2006.01) | |
| *H04N 5/232* | (2006.01) | |
| *G06F 3/0481* | (2013.01) | |

(52) U.S. Cl.
CPC .......... *G06F 3/04883* (2013.01); *G06F 3/167* (2013.01); *G06F 16/316* (2019.01); *G06F 16/35* (2019.01); *G06T 11/60* (2013.01); *H04B 1/3833* (2013.01); *H04L 51/04* (2013.01); *H04L 67/142* (2013.01); *H04M 1/72583* (2013.01); *H04N 5/23216* (2013.01); *H04N 5/23245* (2013.01); *H04N 5/77* (2013.01); *G06T 2200/24* (2013.01); *H04M 2250/22* (2013.01)

(56) References Cited

U.S. PATENT DOCUMENTS

| | | | | |
|---|---|---|---|---|
| 9,710,155 | B2 * | 7/2017 | Zou | G06F 3/0418 |
| 2002/0191029 | A1 * | 12/2002 | Gillespie | G06F 3/0481 |
| | | | | 715/810 |
| 2006/0244735 | A1 * | 11/2006 | Wilson | G06F 3/0488 |
| | | | | 345/173 |
| 2007/0103454 | A1 * | 5/2007 | Elias | G06F 1/1626 |
| | | | | 345/173 |
| 2007/0236475 | A1 * | 10/2007 | Wherry | G06F 3/0485 |
| | | | | 345/173 |
| 2009/0262090 | A1 * | 10/2009 | Oh | G06F 3/04883 |
| | | | | 345/173 |
| 2010/0277422 | A1 * | 11/2010 | Muresianu | G06F 1/1692 |
| | | | | 345/173 |
| 2011/0163988 | A1 * | 7/2011 | Senda | G06F 3/04812 |
| | | | | 345/173 |
| 2012/0249445 | A1 * | 10/2012 | Suzuki | G06F 1/1616 |
| | | | | 345/173 |
| 2013/0016129 | A1 * | 1/2013 | Gossweiler, III | G06F 3/012 |
| | | | | 345/667 |
| 2013/0024820 | A1 * | 1/2013 | Kirkpatrick | G06F 3/04883 |
| | | | | 715/863 |
| 2013/0036388 | A1 * | 2/2013 | Kirkpatrick | G06F 3/04883 |
| | | | | 715/856 |
| 2013/0271369 | A1 * | 10/2013 | Lu | G06F 3/0416 |
| | | | | 345/157 |
| 2014/0028555 | A1 * | 1/2014 | Oh | G06F 3/0547 |
| | | | | 345/158 |
| 2014/0071049 | A1 * | 3/2014 | Min | G06F 3/0488 |
| | | | | 345/158 |
| 2014/0109016 | A1 * | 4/2014 | Ouyang | G06F 17/24 |
| | | | | 715/856 |
| 2014/0137014 | A1 * | 5/2014 | Qiu | G06F 3/0488 |
| | | | | 715/764 |
| 2014/0160073 | A1 * | 6/2014 | Matsuki | G06F 3/0485 |
| | | | | 345/174 |
| 2014/0184503 | A1 * | 7/2014 | Jang | G06F 3/0488 |
| | | | | 345/158 |
| 2014/0232653 | A1 * | 8/2014 | Yagihashi | G06F 3/0416 |
| | | | | 345/158 |
| 2015/0082230 | A1 * | 3/2015 | Lee | G06F 3/04886 |
| | | | | 715/773 |
| 2015/0138083 | A1 * | 5/2015 | Takano | G06F 3/0488 |
| | | | | 345/157 |
| 2015/0205522 | A1 * | 7/2015 | Zeng | G06F 3/04886 |
| | | | | 715/847 |
| 2015/0253870 | A1 * | 9/2015 | Ikeda | G06F 3/0233 |
| | | | | 345/158 |

* cited by examiner

SYSTEM AND METHODS FOR TOUCH TARGET PRESENTATION

CROSS-REFERENCE TO RELATED APPLICATIONS

This application claims priority to U.S. Provisional Application No. 62/183,613 titled SYSTEM AND METHODS FOR A USER INTERFACE AND DEVICE OPERATION filed on Jun. 23, 2015, and U.S. Provisional Application No. 62/184,476 titled SYSTEM AND METHODS FOR A USER INTERFACE AND DEVICE OPERATION filed on Jun. 25, 2015, the content of which is expressly incorporated by reference in its entirety.

FIELD

The present disclosure relates to input contact commands for a device, and in particular, controlling operation of a device and selection of user interface elements and applications with touch targets.

BACKGROUND

Mobile devices and personal communication devices are generally used for multiple purposes. There exist many different ways of controlling these devices. Conventional control methods include the use of dedicated buttons, soft buttons in combination with a user interface, user interfaces with graphical elements, and the use of touch screens. As the number of operations and features on a device increase, basic operations are harder to access. In other instances, changes in display screen size can present challenges to selection of on screen elements. In particular, touch commands for larger display devices can make single hand use more difficult. There exists a need for configurations, features, and control arrangements that allow for improved control and improved access.

BRIEF SUMMARY OF THE EMBODIMENTS

Disclosed and claimed herein are systems, methods and devices for providing touch targets for device interaction. In one embodiment, a method for providing a touch target for device interaction includes displaying, by a device, a touch target on a display of the device, wherein the touch target is displayed in a first position, and detecting, by the device, an input touch command to the display of the device. The method also includes positioning, by the device, the touch target based on the input touch command, wherein the touch target is moved to a second position, and controlling device operation based on position of the touch target.

In one embodiment, the touch target is a graphical element presented as an overlay and the touch target is configured for positioning within the display screen for at least one of selection of and interaction with one or more elements presented by the device.

In one embodiment, the input touch command relates to a touch command to the display associated with a first portion of the display, the input touch command including a contact motion to direct the touch target.

In one embodiment, the input touch command is associated with touch marker presented by the display, wherein touch marker is configured as an input area for positioning the touch target.

In one embodiment, positioning includes scaling detected motion parameters of the input touch command to update the position of the touch target to the second position.

In one embodiment, scaling of motion parameters includes scaling the vertical direction of the input touch command.

In one embodiment, the selection command includes at least one of a touch, tap, and release of the display.

In one embodiment, controlling includes correlating position of the touch target to a graphical element displayed by the device.

In one embodiment, the method also includes detecting a command to initiate presentation of the touch target, and presenting the touch target on the display.

In one embodiment, the method also includes detecting a gesture command and controlling a function of the device based on the detected gesture and position of the touch target.

According to another embodiment, a device is provided including a display configured for presentation of a user interface and a controller configured to control the display and presentation of the user interface. The controller is configured to control displaying of a touch target on a display of the device, wherein the touch target is displayed in a first position, detect an input touch command to the display of the device, and control position of the touch target based on the input touch command, wherein the touch target is moved to a second position. The controller is also configured to control device operation based on position of the touch target.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

One aspect of the disclosure is directed to device configurations for control relative to an input element of the device, such as a display. One or more embodiments are directed towards presentation of graphical elements to interact with user interfaces and applications presented by a device, including a touch target.

As used herein, a touch target relates to a graphical element that can be displayed on display screen of a device, such as a touch screen. According to one embodiment, the touch target may be moved or positioned by the device based on detected inputs to the device. In one exemplary embodiment, the touch target can be a projection of a user contact to the device, such that contact by the user in one portion of the screen can be projected to be interpreted as a contact in another part of the screen, such as the position of the touch target. Similarly, the touch target may be employed to project control position or contact position to other portions of a display. As such, a touch target can provide an offset touch tracking for reaching areas of screen through single hand use.

According to another embodiment, a touch marker may be presented by a device for use with a touch target. According to one embodiment, a touch marker may be a graphical element that is displayed as an overlay and may be used as a starting or control point for positioning a touch target. In certain embodiments, the touch marker may be presented as a graphical input that can be employed to direct and move a touch target and provide functionality, similar joystick control functionality, for moving the position of touch target. In certain embodiments, the touch marker can also act as a button for selection associated with the touch target. According to one embodiment, presentation of a touch marker may be optional.

Single hand use can refer to user of a device by a particular hand while also holding the device with the same hand. However, benefits provided by single hand use can also apply to using a device with two hands, and equally to using a device being supported by some other means other than hands. For example, use of a touch target can allow for contact to a particular portion of the screen, which may be limited and still allow for inputs to be projected to other portions of the display.

According to certain embodiments, touch target functionality may be provided to a device based on initiation. In other embodiments, touch target functionality may be an always up function, such that a touch target is continually displayed by the device.

According to one or more embodiments, processes are provided for providing a touch target for device interaction, control of a touch target and configuration of touch target functionality. Presentation of a touch target can include display of a touch target on a display of the device, detecting input touch commands to the display of the device and positioning the touch target based detected input touch commands to allow for movement of the touch target. The position of the touch target can be used to control device operation. As such, the touch target can aid in accessibility to portions of the display device, and greatly improve operation for single handed use of a device.

One aspect of the disclosure is directed to control configurations for a device and, in particular, to controls and operations for presentation and interaction with touch targets. Devices, such as personal communication devices, portable computers, media players, etc., can be configured with user interfaces including displays and in some cases touch screen capabilities. According to one embodiment, devices may be configured with touch target functionality. Although on screen menus, icons and elements can allow for selection of an application and/or navigation to one or more applications, there is a need for configurations to simplify and/improve control of the device. One or more embodiments are directed towards providing control features that include initiation, control and use of a touch target. Devices, such as personal communication devices, portable computers, media players, etc., can be configured with user interfaces to present a touch target for use with applications and a user interface of the device.

Touch target functionality can be beneficial to allow for improved use and control of a device. In addition, touch target functionality may improve the accessibility and a control of a device by allow for a touch target to reach all portions of a display. Touch target functionality may be especially useful for handheld devices that may be employed within single hand use, and for devices, such as tablets, computers, etc., that have increased display size. In some instances, tough target functionality can overcome the need to use a separate pointer device (e.g., mouse) in addition to the device.

Applications relate to computer programs operating on a device. The computer programs may be part of the operating platform of the device and may be accessed by a user. Applications of the device may each be associated with a particular purpose. By way of example, the device may include applications for web browsing, communications (e.g., phone, messaging, email, etc.), capturing image data, social media, widgets, etc.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Figure 1:
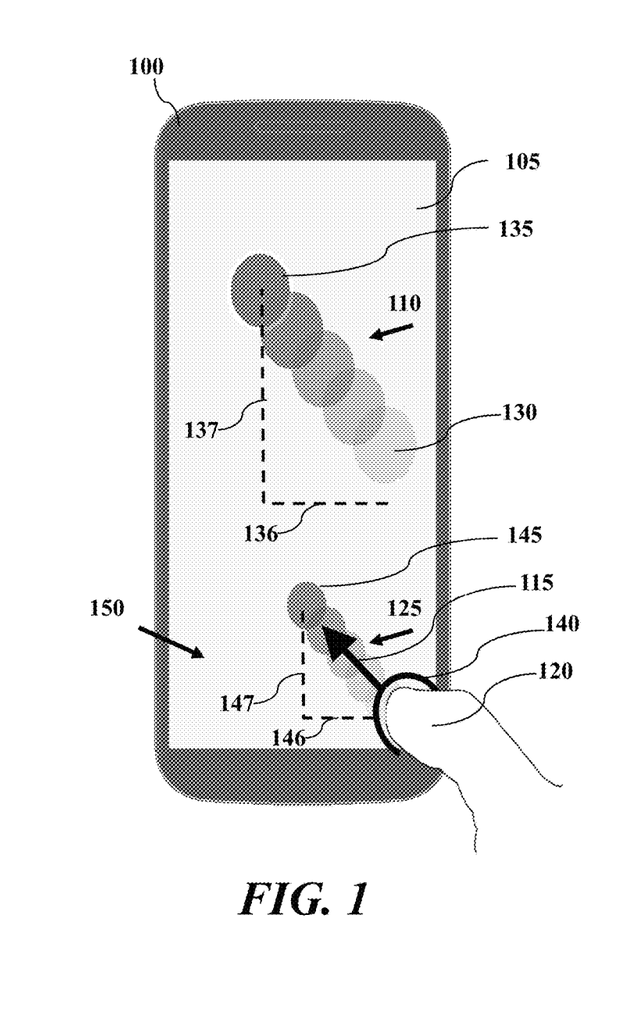
FIG. 1 depicts a graphical representation of touch target presentation according to one or more embodiments.

Referring now to the figures, FIG. 1 depicts a graphical representation of touch target presentation according to one or more embodiments. According to one embodiment, device 100 includes display 105 and is configured to present a touch target. Device 100 may present a user interface for navigation and control of one or more features of the device, such as personal communication, electronic communication and messaging, network browsing, media applications and applications in general. According to one embodiment, display 105 is touch sensitive and may be configured to detect single and multi-point contact to the surface of the display 105. An exemplary input touch is depicted as 115 according to one or more embodiments. Device 100 and display 105 may be configured to detect input touch 115 and device 100 may be configured to control a touch target 110 based on input touch 115 and other input touch commands. Device 100 and display 105 may be configured for presentation of a user interface. Device 100 may include a controller configured to control display 105 and presentation of the user interface, applications and graphical elements including touch target 110.

According to one embodiment, input touch command 115 is depicted as a swipe or drag in a diagonal direction. It should be appreciated that the representation of input touch command 115 in FIG. 1, is an exemplary representation. According to one or more embodiments, an input touch command detected by device 100 for control and/or positioning a touch target 110 may include one or more of horizontal motion, vertical motion, diagonal motion, curved or circular motion, and motion in general with respect to display 105. Input touch command may be generated by touch source 120, such as a user contact, stylus, etc.

According to one embodiment, device 100 is configured to present a touch target 110. Touch target 110 is shown as a circular object; however, the appearance of the touch target may vary and can relate to one or more shapes, sizes and configurations such as square, circular, oval, cross hairs, and other graphical images. According to one embodiment, device 100 is configured to present touch target 110 as an overlay to content presented by display 105, such as graphical elements associated with a user interface (e.g., shortcuts, windows, text boxes, etc.) and applications (e.g., buttons, panels, icons, etc.). According to another embodiment, touch target 110 may be positioned over one or more graphical elements associated with a user interface or application to allow for selection, activation and/or interaction with the graphical elements. According to another embodiment, the position of touch target 110 may be based on one or more input touch commands to device 100.

According to one embodiment, touch target 110 may be presented on display 105 at a first position. As will be discussed in more detail below, initiation and/or requests for the presentation of touch target 110 may be based on a detected command to start presentation. In other embodiments, touch target may be presented on display 105 automatically by device 100. As will further be discussed, the starting position, or initial position that touch target 110 is displayed on display 105 may be based on a predefined position.

FIG. 1 depicts touch target 110 as moving from first position 130 to second position 135. According to one embodiment, movement of touch target 110 may be based on an input touch command, such as input touch command 115. By way of example, an input touch command 115 may be characterized as contact to display 105 during the presentation of touch target 110, and movement of the contact from a starting position 140 to an ending position 145.

According to one embodiment, the amount of movement of touch target 110 may track the amount of movement associated with input touch command 115. By way of example, a horizontal reference 136 and vertical reference 137 relate to the amount of position change for touch target 110 from first position 130 to second position 135. A horizontal reference 146 and vertical reference 147 relate to the amount of position change for touch input command 115 from starting position 140 to an ending position 145. According to one embodiment, device 100 detects input touch command 115 and moves touch target 110 such that the amount of position change for touch target 110 is directly correlated to the path and direction of input touch command 115. In this example, horizontal reference 136 is equivalent to horizontal reference 146 and vertical reference 137 is equivalent to vertical reference 147. According to another embodiment, and as will be described below in FIG. 3, device 100 detects input touch command 115 and moves touch target 110 based on a scaled amount, such that the amount of position change for touch target 110 is scaled in one or more of horizontal and vertical directions. In In this example, horizontal reference 136 may be greater than or equivalent to horizontal reference 146 and vertical reference 137 may be greater than or equivalent to vertical reference 147.

Regarding movement of touch target 110, the appearance and movement of touch target may happen in real time, or appear to happen in real time such that latency of movement from first position to 130 to second position matches or substantially matches input touch command 115. According to another embodiment, it should be appreciated that the path of touch target 110 matches the path of input touch command 115. When the amount of movement is scaled, in one or more directions, the amount of movement for touch target 110 may not correlate one to one to the movement of input touch command. According to another embodiment, movement of touch target 110 may be scaled based on the location of touch target 110. By way of example, as touch target nears particular locations of the display, (e.g., edges of the display, top portions, etc.), the amount of scaling may change or vary to allow for better control of the position of touch target 110.

Touch marker 125 is depicted as a graphical element, may or may not be displayed by device 100. In some cases, touch marker 125 may be positioned in a particular location and can be moved, or at least appear to move, in response to an input, such as input touch command 115. According to another embodiment, touch marker 125 may return to the particular position following completion of touch input command 115.

According to one embodiment, a touch target may be employed to allow for access to portions of a display that are difficult to reach, such as portions difficult to reach in single handed operation.

According to one embodiment, the device may determine an area or portion of a display wherein input touch commands are typically detected. FIG. 1 depicts an exemplary area 150 which may be assigned or predefined as are for detecting input touch commands. In that fashion, the device can project touch target 110 to portions outside of area 150 for selection. Area 150 is exemplary, and although, shown as a rectangular area, the shape of the area may relate to other shapes and regions in general. However, by assigning or determining area 150 to be associated with a particular quadrant, corner or portion of display 105, the device can allow for selection commands to be received for other portions of the display when an input selection is made in area 150. By way of example, touch screen displays may be configured to detect inputs, such as a tap of a graphical element based on contact with display 105. In certain embodiments, when touch target 110 is displayed, input commands such as taps, repeated taps, taps and holds, taps and presses may be detected as being associated with the position of a touch target. In further embodiments, the device may detect the input selection, determine if touch target 110 is associated with a selectable element, and then operate based on whether the location of touch target 110 is associated with or without a selectable graphical element. Area 150 may relate to a particular portion or area of the display where contact is generally associated with, such as the contact area for single hand operation.

Figure 2:
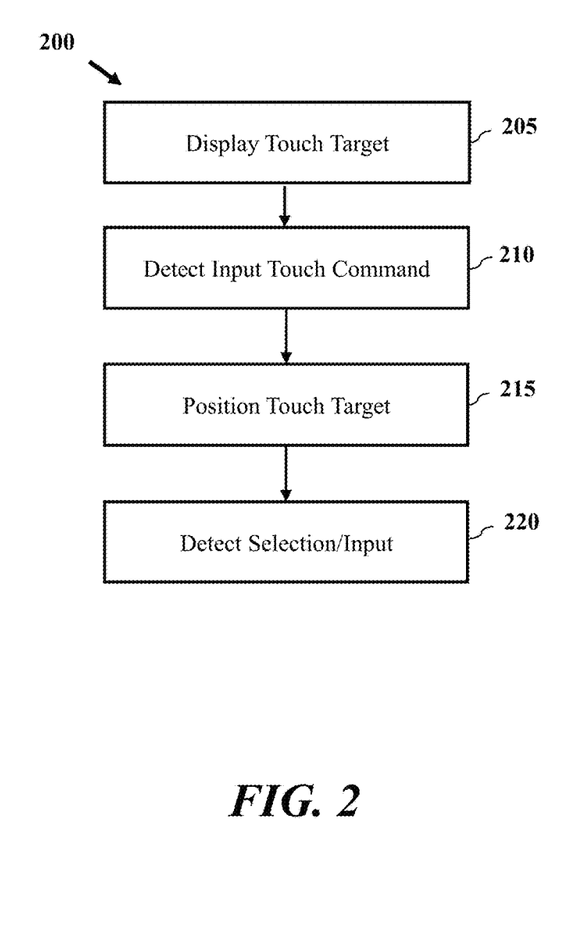
FIG. 2 depicts a process for device operation according to one or more embodiments.

FIG. 2 depicts a process for device operation according to one or more embodiments. According to one embodiment, process 200 may be employed for interaction with a device using a touch target to allow for control of a device (e.g., device 100) and interaction with one or more displayed elements. Process 200 may be initiated by displaying a touch target at block 205. The touch target can be displayed in a first position of a display. According to one embodiment a touch target may be displayed in a particular location of the display at block 205. According to one embodiment, the touch target can be presented anywhere on display screen when initially presented. In certain embodiments, a device may determine one or more different locations for presentation of the touch target. For configurations including a touch marker, the touch target may be displayed near the touch marker. In other configurations, the touch target may be displayed a predetermined distance from an area where contact commands are detected.

According to one embodiment, display of the touch target at block 205 includes presentation of a graphical element which may be presented as an overlay on the display. In that fashion, the touch target can be repositioned to appear above or on top of one or more displayed elements. In addition, the touch target can be displayed with one or more graphical treatments such as color, transparency, etc. to indicate which elements are below the touch target, colocation with a selected item, the ability to interact with a graphical element, etc. The touch target may be configured for positioning within the display screen for at least one of selection of and interaction with one or more elements presented by the device.

The command detected at block 210 may include contact to a display (e.g., display 105) of a device (e.g., device 100). In one embodiment, the input touch command includes motion relative to the display to position the touch target command. The input touch command detected at block 210 can relate to a touch command to the display associated with a first portion of the display and can include a contact motion to direct the touch target. In certain embodiments, the device detects motion across the device, such as a swipe, drag or directional movement and characterizes the movement for position the touch target. By way of example, a detected input touch command that included horizontal motion relative to the display screen would be characterized for moving the touch target in a horizontal direction.

In certain embodiments, the input touch command at block 210 is associated with a touch marker presented by the display. The touch marker may be configured as an input area for positioning the touch target.

Based on the detected input touch command at block 210, the device can position the touch target at block 215. Positioning the touch target at block 215 can include characterization of the input touch command, determining a second position for the touch t target and scaling the detected motion in one or more directions. At block 215, the touch target is presented in a second position. In certain embodiments, positioning of the touch target can relate to incremental changes in the position of the touch target so that the touch target appears to move while input touch commands are received. One or more input touch commands can be received and detected to allow for one or more positioning locations of the touch target.

In certain embodiments, positioning at block 215 includes scaling detected motion parameters of the input touch command to update the position of the touch target to the second position. Scaling can be applied to one or more of horizontal and vertical directions of movement. By way of example, scaling of motion parameters includes scaling the vertical direction of the input touch command and with no application of scaling in the horizontal plane.

According to one embodiment, by displaying a touch target at block 205, detecting an input, such as an input touch command, at block 210 and positioning the touch target at block 215, a touch target can be presented to any location of the display to allow a user to interact with a graphical elements, such as elements of the user interface and applications. Moreover, the elements associated with the position of the touch target can then be selected based on a selection and/or input command without requiring the user to actually contact the position of the graphical element, but rather contact a portion of the screen that is closer to the input source.

At block 220, a selection and/or input relative to the displays can be selected. Selection commands can include at least one of a touch, tap, and release of the display. The device can control device operation based on position of the touch target when a selection and/or input is detected. For example, when a touch target is associated with a selectable and/or intractable element, the device can then proceed with selection and/or interaction of that element as if the contact detected at block 220 to the display was in the position of the touch target. As such, a touch target can project user contact to other portions of the display, while still allowing for touch to the device. Controlling by the device includes correlating position of the touch target to a graphical element displayed by the device based on as detected selection at block 220. In certain embodiments, process 200 includes detecting a gesture command and controlling a function of the device based on the detected gesture and position of the touch target.

As will be discussed in more detail below particularly with FIG. 5, touch target functionality may be invoked based on one or more commands. Accordingly, process 200 may include detecting a command to invoke/present the touch target prior to presentation of the touch target. In that fashion, detecting a command to initiate presentation of the touch target can trigger or initiate presentation of the touch target on the display. Similarly, process 200 may include detecting input commands to end the presentation of the touch target.

Figure 3:
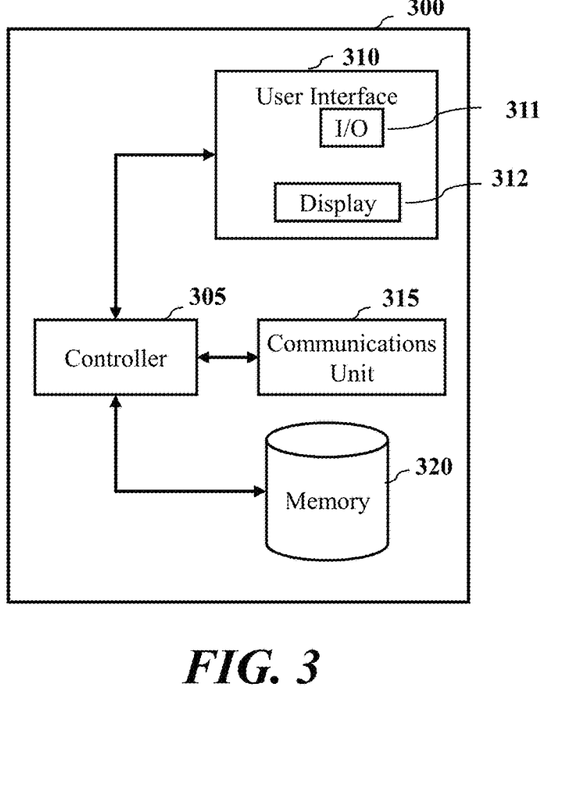
FIG. 3 depicts a graphical representation of a device according to one or more embodiments.

FIG. 3 depicts a graphical representation of a device according to one or more embodiments. According to one embodiment, device 300 is configured to present a touch target. FIG. 3 depicts a representation of elements of device 100 according to one or more embodiments.

Device 300 includes controller 305, user interface 310, communications unit 315, memory 320 and image sensor module 325. Controller 305 may communicate with each of user interface 310, communications unit 315, and memory 320 by way of one or more communication links within device 300.

Device 300 includes controller 305 configured to control presentation of a graphical user interface the at least one image sensor and display. According to certain embodiments, controller 305 may be configured to detect a command to launch an image capture functionality of the device. The command can include contact to display 312. In response, controller 305 can control display of an overlay window on display 312 in response to the command. Controller 305 is also configured to detect a capture command for image capture by the device 300. The capture command can relates to detection of a release of the contact to the display 312. Controller 305 controls capture of image data in response to the capture commands.

Controller 305 may be configured to execute code stored in memory 320 for operation of device 300 including presentation of a graphical user interface, overlay windows, graphical elements, etc. Controller 305 may include a processor and/or one or more processing elements. In one embodiment controller 305 may be include one or more of hardware, software, firmware and/or processing components in general. According to one embodiment, controller 305 may be configured to perform one or more processes described herein.

User interface 310 is depicted as including an input/output (I/O) interface 311 and display 312. According to one embodiment, commands to device 300 may be detected by display 312, such as swipe, slide, contact, touch stylus, and touch screen commands. Commands to invoke functionality may be input relative to display 312 of user interface 310. Device 300 includes display 312 configured for presentation of a user interface and overlay windows. User interface 310 may be configured to receive one or more commands via an input/output (I/O) interface 311 which may include one or more inputs or terminals to receive user commands.

Communications unit 315 may be configured to allow for transmission and reception of data relative to device 300. Communications unit 315 may be configured for wired and/or wireless communication with one or more network elements, such as servers. Memory 320 may be configured to store data captured by device 300 and to store instructions for operation of device 300. Memory 320 may include non-transitory RAM and/or ROM memory for storing executable instructions, operating instructions and content for display.

Figure 4:
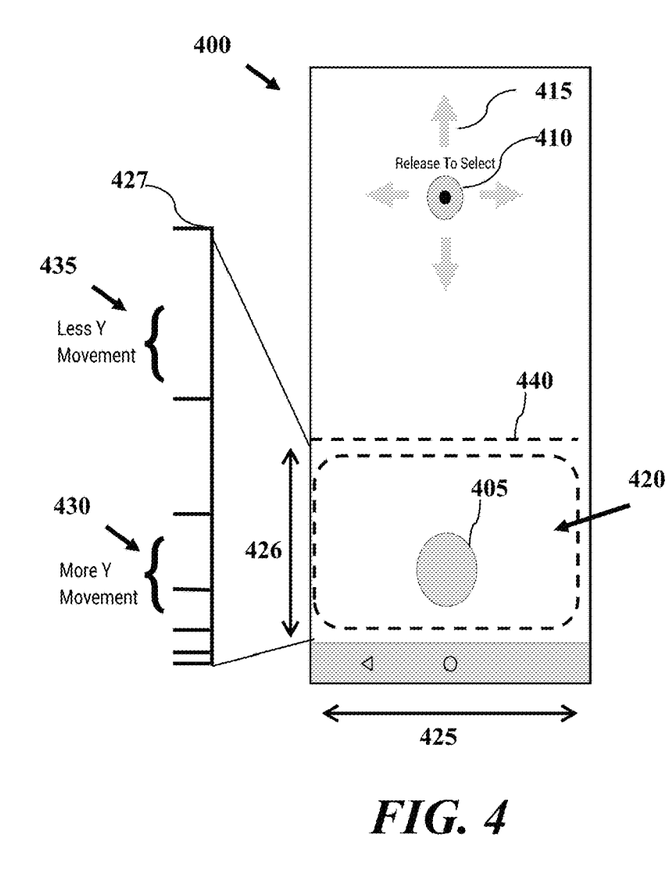
FIG. 4 depicts a graphical representation of device configurations according to one or more embodiments.

FIG. 4 depicts a graphical representation of device configurations according to one or more embodiments. According to one or more embodiments, a device may be configured to scale input touch commands to allow for greater control of a touch target. By way of example, when a device includes a rectangular display, single hand user will generally result in the device being held in an upright/portrait configuration with input contact being in the lower portion of the display (see. FIG. 1). As such, input contact commands can readily allow for the user to contact the lower portion of the display, particularly the full horizontal distance of the display and be limited beyond a particular vertical region. According, presentation of a touch target can provide a mechanism to reach any part of the screen and allow for use with one hand. Similar challenges can be presented with single hand use of a device in landscape orientation when the users hand is only able to reach a limited portion of the display.

FIG. 4 depicts an exemplary arrangement for scaling input relative to portions of display 400 (e.g., display 105). FIG. 4 depicts display of touch marker 405 and touch target 410. Display of touch marker 405 and touch target 410 may be based on a command to invoke touch target functionality. Direction arrows 415 of the particular directions touch target 410 may be repositioned are shown in FIG. 4 and may be optionally presented by display 400.

According to one an embodiment, a device (e.g., device 100) may be configured to scale input contact commands relative to portions of the display. Exemplary configurations for a portrait orientation are presented in FIG. 4. According to one embodiment, input touch commands may be associated with area 420 which may be associated with a particular area wherein put commands are detected. Input commands in horizontal direction 425 and vertical direction 426 may be scaled. In certain embodiments, input commands in horizontal direction 425 are not scaled (e.g., Horizontal movement of touch marker to input detected is a 1:1 ratio). An exemplary representation of scaling in the vertical direction 426 is shown in FIG. 4 by scale 427. Scale 427 may be configured to scale input touch commands, by one or more ratios, such that within area 420 can be translated. According to one embodiment, inputs are scaled based on a fixed conversion ratio (e.g., 1.5:1, 2:1, 3:1, etc.) such that the amount of movement for the touch target 410 in the vertical direction is some multiple of the input touch command detected. Alternatively, the amount of scaling may vary based on the position of the touch target 410 and/or the length of the input touch command. By way of example, as touch target 410 nears the top portion of the display, the scaling may be decreased and/or eliminated. In other embodiments, touch target may be repositioned during the input contact command such that as the touch command lengths and the touch target moves closer to the vertical limit of display, the amount of scaling is decreased. In that fashion, an input touch command (e.g., swipe and hold, drag, etc.) can position touch target from a position on display 400 to positions of the display 400 away from the contact source, while still allowing for the contact source to remain in a particular area, such as area 420. Exemplary scale 427 includes a first scaling region 430 and a second scaling region 435. According to one embodiment, first scaling region 430 may be configured to allow for more vertical (e.g., "Y") movement, while scaling region 430 may be configured to allow for less vertical (e.g., "Y") movement to reduce the amount of vertical change the touch target will be positioned and allow for better control of touch target position.

Figure 5:
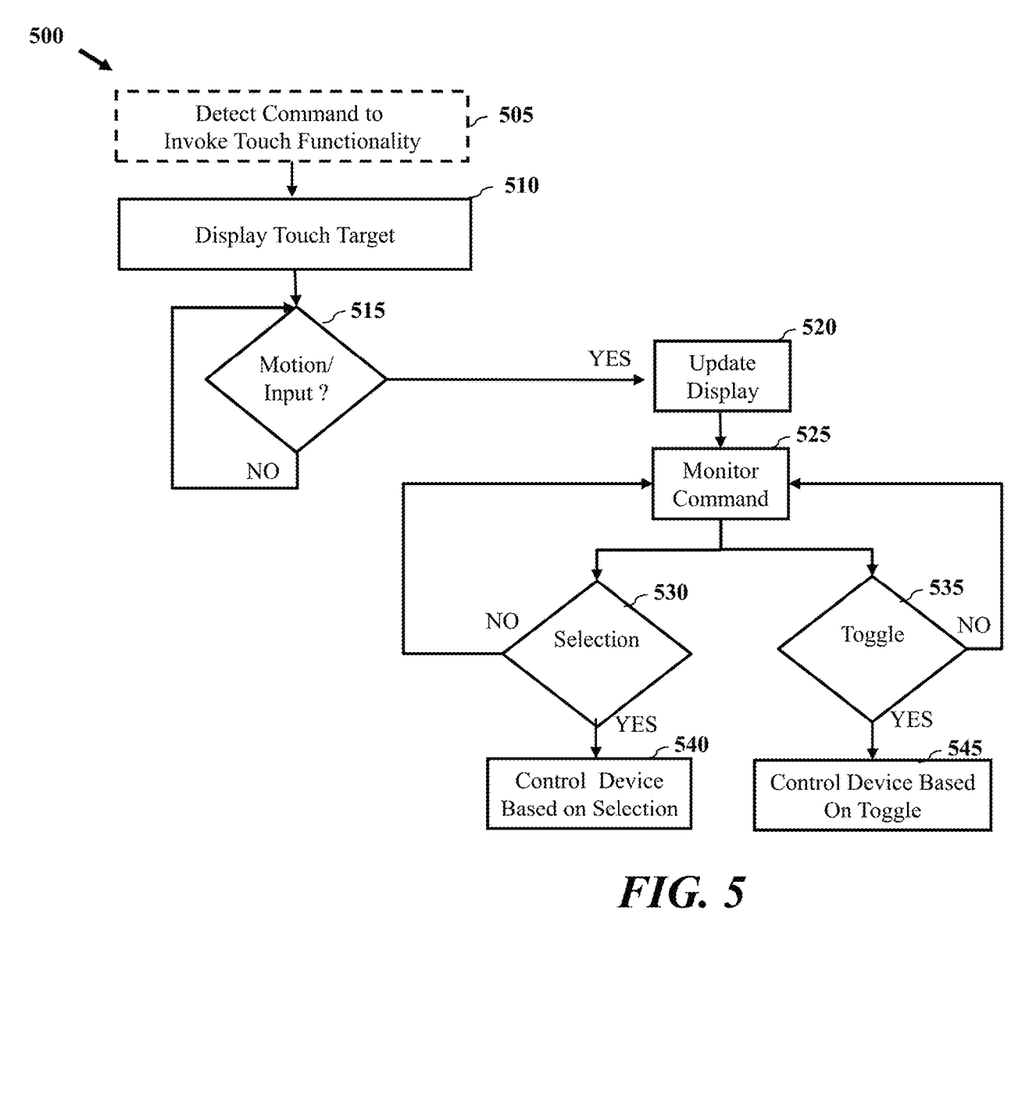
FIG. 5 depicts a process according to one or more embodiments.

FIG. 5 depicts a process according to one or more embodiments. Process 500 may be employed by a device to provide a touch target functionality according to one or more embodiments. Process 500 may optionally be initiated by detecting a command to invoke touch functionality at block 505. The command at block 505 may be an off-screen to on screen swipe. In certain embodiments, the command at block 505 relates to contact, swipe along the surface of the display wherein the contact is held to the display following the swipe.

At block 410, the device is configured to present a touch target and detect motion and/or input to the display of the device at decision block 515. When input contact commands are not input or detected (e.g. "NO" path out of decision block 515), the device continues to monitor input commands at block 515. When input contact commands are detected (e.g. "YES" path out of decision block 515), the device updates the display at block 520. Updating the display can include moving and/or repositioning a touch target on the display. According to another embodiment, process 500 includes monitoring the input command at block 525. In that fashion, the device is configured to detected input command and update the position of the touch target while allowing for additional commands, such as movement and/or selection, to be detected.

The device can characterize commands at block 525 and determined whether a selection is made at decision block 530 or a toggle command is received at block 535.

According to one embodiment, process 500 can include determining whether a selection is made of the user interface or an application at decision block 530 based at least in part on the position of the touch target and detected interactions with the display. For example, position of the touch target on a user interface or application element and then selecting, tapping, releasing the display etc., can indicate an input command to select the item associated with the position of the touch target. To that end, when a selection command is detected (e.g. "YES" path out of decision block 530), process 500 can control the device based on the selection at block 540. When a selection is not detected (e.g. "NO" path out of decision block 530), process 500 continues to monitor commands at block 525.

According to one embodiment, process 500 can include determining whether a toggle command is made on the user interface or an application at decision block 535 based at least in part on the position of the touch target and detected interactions with the display. For example, position of the touch target on a user interface or application element and then detection of a toggle command can result in the device performing operations in addition to a selection. When a toggle command is detected (e.g. "YES" path out of decision block 535), process 500 can control the device based on the toggle command and position of the touch target at block 545. When a toggle command is not detected (e.g. "NO" path out of decision block 535), process 500 continues to monitor the command at block 525.

FIGS. 6A-6D depict graphical representations of touch target features according to one or more embodiments. According to one embodiment, presentation of the touch target and use may allow for multiple device functions.

Figure 6A:
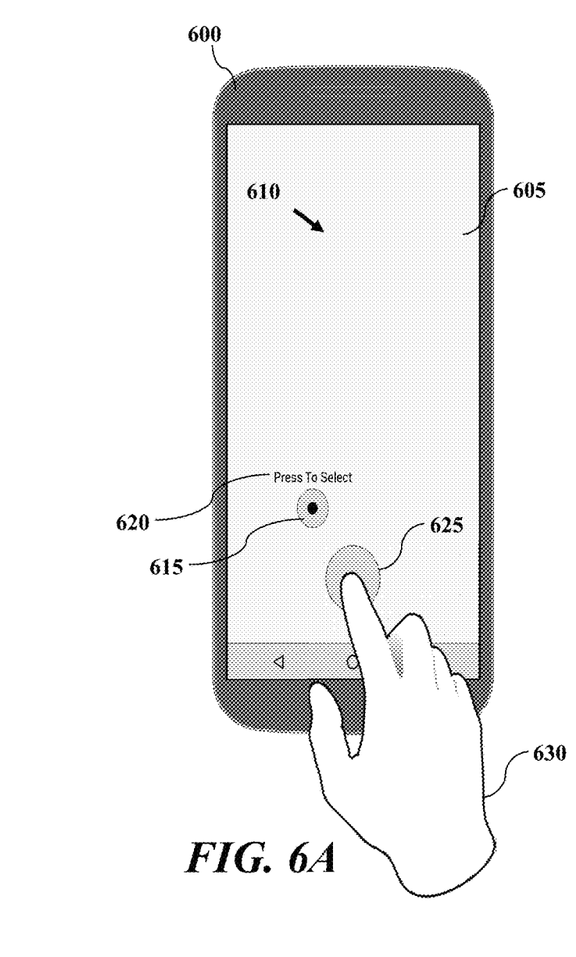
FIGS. 6A-6D depict graphical representations of touch target features according to one or more embodiments.

FIG. 6A depicts an initial configuration for presentation of a touch target. According to one embodiment, device 600 including display 605 is configured to present a user interface 610 that can include presentation of touch target 615 as a graphical element. Touch target 615 may be presented in the one or more location of the display. According to one embodiment, device 600 may include a message 620 to indicate that the touch target may be activated based on a selection or contact to the screen, such as contact to touch marker 625. Based on the contact to the display 605 or touch marker 625, touch functionality can be initiated. By allowing for touch target 615 to be displayed on the device, the device can allow for presentation of a touch target when needed by the user.

Figure 6B:
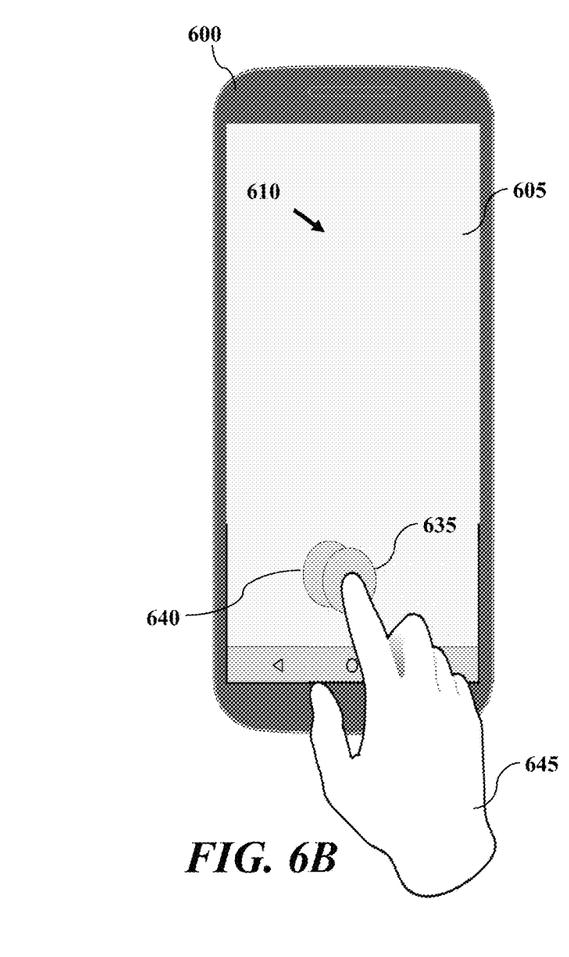

FIG. 6B depicts device 600 with display 605 and user interface 610, and touch marker 635. According to one embodiment, device 600 may present touch marker 635 and initiate touch target functionality and presentation of touch target 640 based on selection of touch marker 635. In that fashion, touch marker 635 can be presented to allow for initiation of touch target 640, such that selection of tough marker 635 is detected by device 600 and touch target 640 is presented. FIG. 6B also depicts an exemplary starting point for presentation of a touch target 640. According to one embodiment, touch target 640 is presented near and/or to appear as being partially covered by touch marker 635.

Figure 6C:
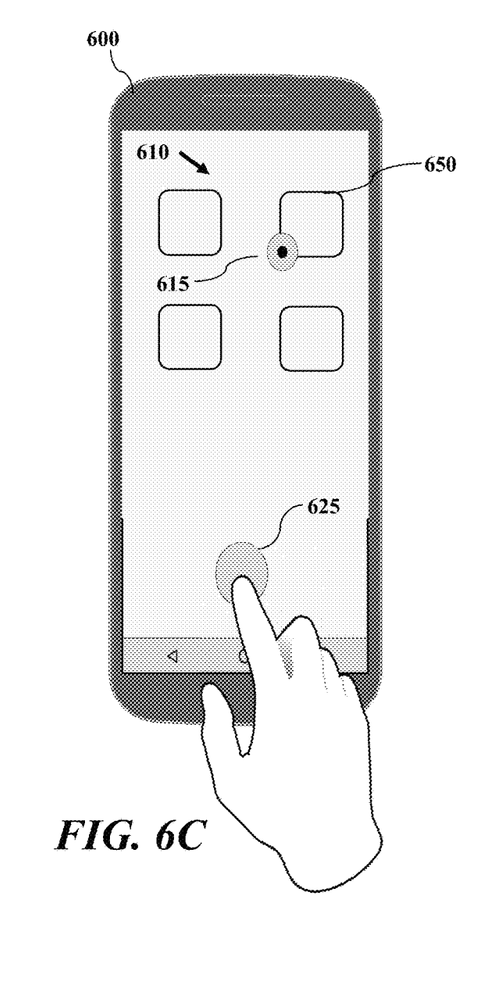

FIG. 6C depicts device 600 with display 605 and user interface 610, touch target 615 and touch marker 625. According to one embodiment, positioning touch target 615 to be associated with the location of a graphical element, such as graphical element 650 can allow for selection of the graphical element 650. According to one embodiment, graphical element 650 can be associated with a user interface (e.g., home screen, control panel, etc.) and/or a selectable element of an application. In one embodiment, positioning touch target 615 on graphical element 650, device 600 can stop presentation of touch target 615 on release of the input touch command when the item underneath the touch target is selected. In other embodiments, the touch target 615 can remain displayed following selection or interaction with graphical element 650 to allow for a plurality of touch events. According to another embodiment, upon selection of graphical element 650, by touch target 615, device 600 may present the selected graphical element 650 with one or more graphical treatments (e.g., increased size, glow, color change, etc.) to indicate that the element is selected.

Figure 6D:
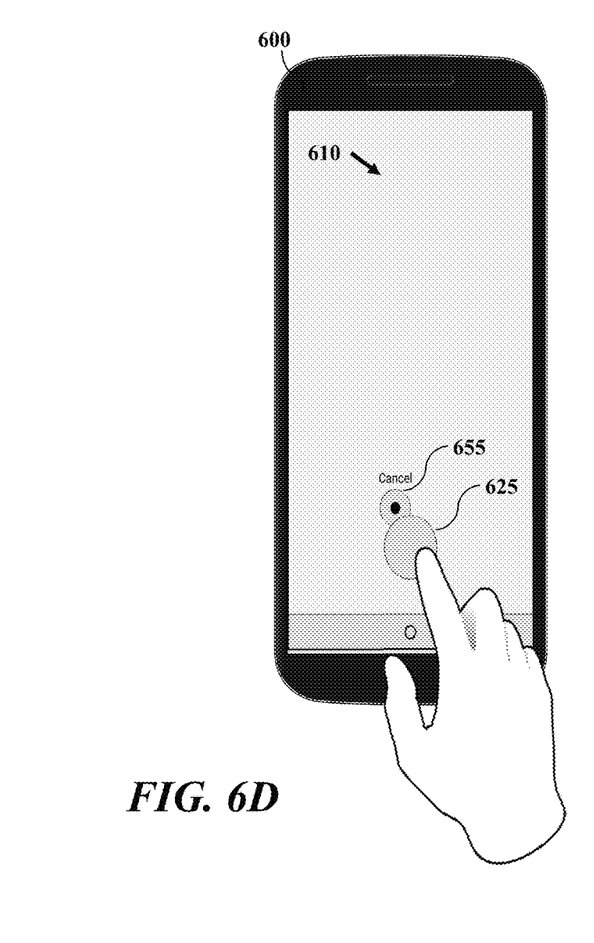

FIG. 6D depicts device 600 with display 605 and user interface 610, touch marker 625 and touch target 655. According to embodiment, device 600 may be optionally configured to allow for pulling touch target 655 down to touch marker 625 to cancel touch target functionality. In that fashion, the touch target functionality can be shut off or disabled when not needed.

FIGS. 7A-7E depict graphical representations of gesture operations according to one or more embodiments. According to one embodiment, one or more gesture commands may be detected during presentation of a touch target. FIGS. 7A-7E depict graphical representations of an exemplary display window 700 including touch target 701 and exemplary representations of gesture commands. According to one embodiment, gesture commands detected during presentation of touch target 701 can allow for the device to interpret one or more additional commands in addition to simply selecting a graphical element displayed on a device.

Figure 7A:
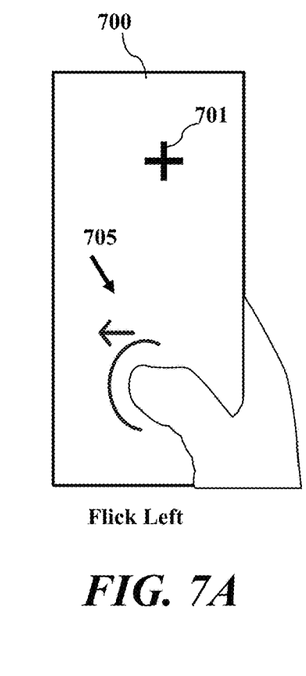
FIGS. 7A-7E depict graphical representations of gesture operations according to one or more embodiments.
Figure 7B:
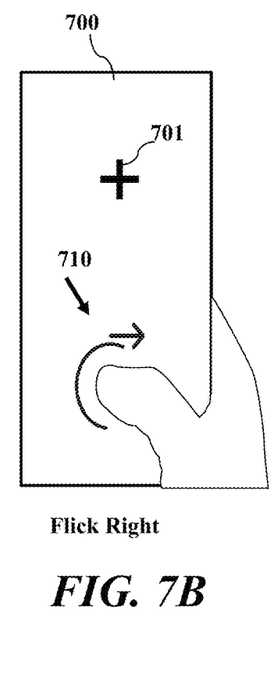
Figure 7C:
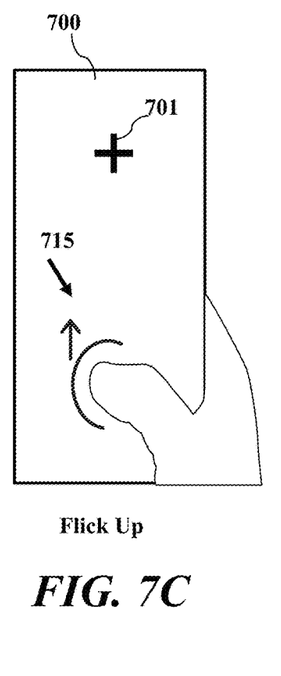
Figure 7D:
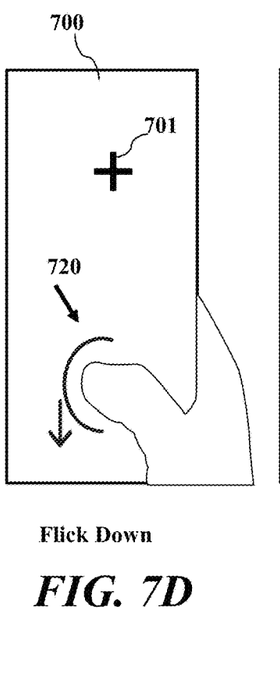
Figure 7E:
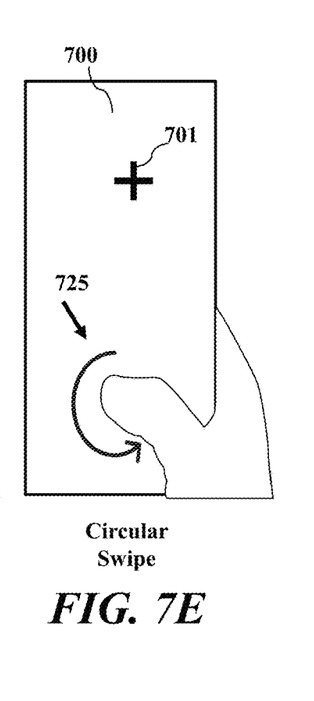

According to an exemplary embodiment, gesture commands can include at least one of a flick left command 705 of FIG. 7A, a flick right command 710 of FIG. 7A, a flick up command 715 of FIG. 7C, a flick down command 720 of FIG. 7D, and a circular swipe command 725 of FIG. 7E. Gesture command 705-725 can include contact and a particular motion, such as flick or path specific movement which touch target 701 is displayed. In that fashion, the location of the touch target 701 and the particular gesture command can result in a plurality of input command types. One or more gesture commands may be detected during presentation of touch target 701. Gesture commands may allow for non-standard gestures or inputs to provide custom settings, for example a short cut to control settings of device 700.

While this disclosure has been particularly shown and described with references to exemplary embodiments thereof, it will be understood by those skilled in the art that various changes in form and details may be made therein without departing from the scope of the claimed embodiments.

What is claimed is:

1. A method for providing a touch target for device interaction, the method comprising:

displaying, by a device, a touch target on a display of the device, wherein the touch target is displayed in a first position;

displaying, by the device, a touch marker in a particular position for use with a touch target wherein the touch marker is a graphical element displayed in a location as an overlay for positioning the touch target;

detecting, by the device, an input touch command to the display of the device, wherein the input touch command positions the touch marker to a display location, wherein the touch marker is configured as an input area for positioning the touch target, the touch marker returning to the particular position following completion of the input touch command;

positioning, by the device, the touch target based on the input touch command, wherein the touch target is moved to a second position, wherein positioning includes scaling detected motion parameters of the input touch command to update position of the touch target to the second position, wherein scaling of motion parameters includes scaling a vertical direction of the input touch command, scaling the vertical direction by a first scaling region for more vertical movement, and a second scaling region for less vertical movement to reduce the amount of vertical change, and wherein horizontal motion of the input touch command is scaled to a 1 to 1 ratio; and controlling device operation based on position of the touch target.

2. The method of claim 1, wherein the touch target is a graphical element presented as an overlay and the touch target is configured for positioning within the display screen for at least one of selection of and interaction with one or more elements presented by the device.

3. The method of claim 1, wherein the input touch command relates to a touch command to the display associated with a first portion of the display, the input touch command including a contact motion to direct the touch target.

4. The method of claim 1, wherein the touch marker is configured to act as a button for selection associated with the touch target.

5. The method of claim 1, wherein an amount of scaling of motion parameters is varied based on the position of the touch target and a length of the input touch command.

6. The method of claim 1, wherein scaling of motion parameters is decreased as the touch target moves closer to a vertical limit of display.

7. The method of claim 1, wherein a selection command includes at least one of a touch, tap, and release of the display.

8. The method of claim 1, wherein controlling includes correlating position of the touch target to a graphical element displayed by the device.

9. The method of claim 1, further comprising detecting a command to initiate presentation of the touch target, and presenting the touch target on the display.

10. The method of claim 1, further comprising detecting a gesture command and controlling a function of the device based on the detected gesture and position of the touch target.

11. A device comprising:
a display configured for presentation of a user interface; and
a controller configured to control the display and presentation of the user interface, wherein the controller is configured to
control displaying of a touch target on a display of the device, wherein the touch target is displayed in a first position;
display a touch marker in a particular position for use with a touch target wherein the touch marker is a graphical element displayed in a location as an overlay for positioning the touch target;
detect an input touch command to the display of the device, wherein the input touch command positions the touch marker to a display location, wherein the touch marker is configured as an input area for positioning the touch target, the touch marker returning to the particular position following completion of the input touch command, wherein positioning includes scaling detected motion parameters of the input touch command to update position of the touch target to the second position, wherein scaling of motion parameters includes scaling a vertical direction of the input touch command, scaling the vertical direction by a first scaling region for more vertical movement, and a second scaling region for less vertical movement to reduce the amount of vertical change, and wherein horizontal motion of the input touch command is scaled to a 1 to 1 ratio;

control position of the touch target based on the input touch command, wherein the touch target is moved to a second position; and control device operation based on position of the touch target.

12. The device of claim 11, wherein the touch target is a graphical element presented as an overlay and the touch target is configured for positioning within the display screen for at least one of selection of and interaction with one or more elements presented by the device.

13. The device of claim 11, wherein the input touch command relates to a touch command to the display associated with a first portion of the display, the input touch command including a contact motion to direct the touch target.

14. The device of claim 11, wherein the touch marker is configured to act as a button for selection associated with the touch target.

15. The device of claim 11, wherein an amount of scaling of motion parameters is varied based on the position of the touch target and a length of the input touch command.

16. The device of claim 11, wherein scaling of motion parameters is decreased as the touch target moves closer to a vertical limit of display.

17. The device of claim 11, wherein a selection command includes at least one of a touch, tap, and release of the display.

18. The device of claim 11, wherein controlling includes correlating position of the touch target to a graphical element displayed by the device.

19. The device of claim 11, further comprising detecting a command to initiate presentation of the touch target, and presenting the touch target on the display.

20. The device of claim 11, further comprising detecting a gesture command and controlling a function of the device based on the detected gesture and position of the touch target.

* * * * *